(12) United States Patent
Felton

(10) Patent No.: US 12,395,116 B2
(45) Date of Patent: Aug. 19, 2025

(54) LABOR SAVING SOLAR ROOFING SHINGLE

(71) Applicant: Colin Felton, Coos Bay, OR (US)

(72) Inventor: Colin Felton, Coos Bay, OR (US)

( * ) Notice: Subject to any disclaimer, the term of this patent is extended or adjusted under 35 U.S.C. 154(b) by 0 days.

(21) Appl. No.: 17/411,050

(22) Filed: Aug. 24, 2021

(65) Prior Publication Data

US 2022/0060141 A1    Feb. 24, 2022

Related U.S. Application Data

(60) Provisional application No. 63/069,673, filed on Aug. 24, 2020.

(51) Int. Cl.
| | |
|---|---|
| *H02S 20/25* | (2014.01) |
| *E04D 1/00* | (2006.01) |
| *E04D 1/30* | (2006.01) |
| *F24S 10/70* | (2018.01) |
| *F24S 80/30* | (2018.01) |

(Continued)

(52) U.S. Cl.
CPC ............... *H02S 20/25* (2014.12); *E04D 1/29* (2019.08); *E04D 1/30* (2013.01); *F24S 10/70* (2018.05); *F24S 80/30* (2018.05); *H01R 13/04* (2013.01); *H01R 13/10* (2013.01); *H02S 40/34* (2014.12); *H02S 40/36* (2014.12); *H02S 40/44* (2014.12); *E04D 1/265* (2013.01)

(58) Field of Classification Search
CPC .... E04D 1/29; E04D 1/30; F24S 10/70; F24S 80/30; H02S 20/23; H02S 20/24; H02S 20/25; H02S 40/34; H02S 40/36; H01R 13/04; H01R 13/10
See application file for complete search history.

(56) References Cited

U.S. PATENT DOCUMENTS 2,362,236 A * 11/1944 Bassler .................... E04D 1/08
52/541
4,040,867 A * 8/1977 Forestieri ................ H02S 20/23
52/173.3

(Continued)

FOREIGN PATENT DOCUMENTS

CA    2697221 A1 * 9/2010 ............ C09J 195/00
CN    2879431 Y * 3/2007

(Continued)

OTHER PUBLICATIONS

Jul. 19, 2015 Advantages of Thermoplastic Bulk Molding Compound for Compression Molding of Composite Parts Sponsored by TenCate Advanced Composites https://web.archive.org/web/20150719190308/https://www.azom.com/article.aspx?ArticleID=11925#4 (Year: 2015).*

*Primary Examiner* — Brian D Mattei
*Assistant Examiner* — Joseph J. Sadlon
(74) *Attorney, Agent, or Firm* — Mohr Intellectual Property Law Solutions, PC

(57) ABSTRACT

Embodiments relate to an enhanced method for installing solar roofs by primarily reducing the installation time. The design is for a roofing shingle with an embedded solar module that installs intuitively like normal roofing shingles without special tools, fasteners or alignment. The shingle structure is molded out of low thermal expansion plastic composite and is compatible with commercial photovoltaic modules as well as solar infrared radiation absorbing devices.

7 Claims, 16 Drawing Sheets

(51) Int. Cl.
  *H01R 13/04* (2006.01)
  *H01R 13/10* (2006.01)
  *H02S 40/34* (2014.01)
  *H02S 40/36* (2014.01)
  *H02S 40/44* (2014.01)
  *E04D 1/26* (2006.01)
  *F24S 20/00* (2018.01)
  *F24S 25/00* (2018.01)
  *F24S 25/632* (2018.01)

(56) References Cited

U.S. PATENT DOCUMENTS

| | | | | |
|---|---|---|---|---|
| 4,047,516 A * | 9/1977 | Bruel | F24S 80/30 | 126/658 |
| 4,164,933 A * | 8/1979 | Alosi | F24S 20/64 | 126/621 |
| 4,213,929 A * | 7/1980 | Dobson | F24S 80/30 | 165/905 |
| 4,269,172 A * | 5/1981 | Parker | F24S 10/753 | 126/621 |
| 4,287,883 A * | 9/1981 | Kyrias | F24S 40/60 | 126/561 |
| 4,299,202 A * | 11/1981 | Mayo | F24S 20/67 | 126/588 |
| 4,300,539 A * | 11/1981 | Dobson | B28B 7/342 | 126/621 |
| 4,336,413 A * | 6/1982 | Tourneux | H02S 20/23 | 52/173.3 |
| 4,364,374 A * | 12/1982 | Brazzola | F24S 10/30 | 126/677 |
| 4,410,757 A * | 10/1983 | Stamminger | H02S 40/44 | 136/246 |
| 4,597,378 A * | 7/1986 | Smith | F24S 80/457 | 126/704 |
| 4,729,202 A * | 3/1988 | Ferland | E04D 1/08 | 52/525 |
| 5,030,107 A * | 7/1991 | Moon | H01R 12/7076 | 439/62 |
| 5,232,518 A * | 8/1993 | Nath | E04D 3/3605 | 52/509 |
| 5,337,529 A * | 8/1994 | Lutin | E04D 1/16 | 52/391 |
| 5,338,369 A * | 8/1994 | Rawlings | F24S 20/67 | 136/246 |
| 5,509,246 A * | 4/1996 | Roddy | E04D 1/29 | 126/621 |
| 5,711,126 A * | 1/1998 | Wells | E04D 3/40 | 52/309.1 |
| 5,768,831 A * | 6/1998 | Melchior | F24S 20/69 | 52/522 |
| 5,986,203 A * | 11/1999 | Hanoka | H01L 31/048 | 52/173.3 |
| 5,990,414 A * | 11/1999 | Posnansky | H02S 20/23 | 52/173.3 |
| 6,212,843 B1 * | 4/2001 | Kalkanoglu | B26D 3/14 | 52/311.1 |
| 6,489,552 B2 * | 12/2002 | Yamawaki | H02S 20/25 | 52/173.3 |
| 6,606,830 B2 * | 8/2003 | Nagao | H02S 20/23 | 52/173.3 |
| 6,647,979 B2 * | 11/2003 | Snyder | F24S 10/742 | 126/621 |
| 6,670,541 B2 * | 12/2003 | Nagao | H02S 30/10 | 52/173.3 |
| 6,840,799 B2 * | 1/2005 | Yoshikawa | H02S 40/36 | 439/502 |
| 6,928,775 B2 * | 8/2005 | Banister | H02S 20/25 | 52/173.3 |
| 7,178,295 B2 * | 2/2007 | Dinwoodie | H02S 20/23 | 136/246 |
| 7,297,867 B2 * | 11/2007 | Nomura | H02S 20/23 | 52/173.3 |
| 7,642,449 B2 * | 1/2010 | Korman | F24S 25/632 | 52/173.3 |
| 7,663,561 B2 * | 2/2010 | Hisaeda | B32B 17/10376 | 439/329 |
| 7,677,935 B2 * | 3/2010 | Ogata | H01R 13/04 | 439/845 |
| 7,690,163 B2 * | 4/2010 | McMahan | B29C 70/46 | 52/789.1 |
| 7,713,089 B2 * | 5/2010 | Faust | H02S 20/25 | 439/620.21 |
| 7,971,398 B2 * | 7/2011 | Tweedie | F24S 25/632 | 52/173.3 |
| 8,061,091 B2 * | 11/2011 | Botkin | F24S 25/20 | 52/173.3 |
| 8,136,322 B2 * | 3/2012 | Shadwell | E04D 1/20 | 52/553 |
| 8,173,889 B2 * | 5/2012 | Kalkanoglu | H02S 20/23 | 136/244 |
| 8,209,920 B2 * | 7/2012 | Krause | H01L 31/02008 | 52/173.3 |
| 8,234,824 B2 * | 8/2012 | Botkin | F24S 25/20 | 52/173.3 |
| 8,242,350 B2 * | 8/2012 | Cashion | H01L 31/052 | 136/246 |
| 8,272,176 B2 * | 9/2012 | Wallgren | F24S 25/13 | 52/173.3 |
| 8,312,693 B2 * | 11/2012 | Cappelli | H02S 20/25 | 52/173.3 |
| 8,316,591 B2 * | 11/2012 | Miyamoto | F24S 25/20 | 52/173.3 |
| 8,476,523 B2 * | 7/2013 | Bennett | H02S 20/25 | 136/251 |
| 8,505,248 B1 * | 8/2013 | Leong | F24S 25/16 | 52/173.3 |
| 8,607,509 B2 * | 12/2013 | Gurr | E04D 13/103 | 52/173.3 |
| 8,621,813 B2 * | 1/2014 | Dube | H02S 40/36 | 52/173.3 |
| 8,640,402 B1 * | 2/2014 | Bilge | E04D 13/103 | 52/173.3 |
| 8,656,657 B2 * | 2/2014 | Livsey | H02S 20/25 | 52/173.3 |
| 8,695,289 B2 * | 4/2014 | Koch | H01L 31/044 | 52/173.3 |
| 8,701,361 B2 * | 4/2014 | Ferrara | H02S 30/10 | 126/621 |
| 8,707,643 B1 * | 4/2014 | Kalkanoglu | H02S 40/425 | 52/173.3 |
| 8,713,861 B2 * | 5/2014 | Desloover | F24S 20/67 | 52/173.3 |
| 8,740,642 B2 * | 6/2014 | Keenihan | H01R 31/00 | 439/512 |
| 8,776,455 B2 * | 7/2014 | Azoulay | H02S 40/36 | 52/173.3 |
| 8,782,972 B2 * | 7/2014 | Grieco | H02S 20/24 | 52/173.3 |
| 8,813,460 B2 * | 8/2014 | Cinnamon | F24S 25/61 | 52/173.3 |
| 8,853,520 B2 * | 10/2014 | Ueda | H02S 40/36 | 136/244 |
| 8,875,454 B2 * | 11/2014 | Arguelles | H02S 20/25 | 126/621 |
| 8,898,970 B2 * | 12/2014 | Jenkins | H10F 19/20 | 52/579 |
| 8,922,972 B2 * | 12/2014 | Korman | H02S 40/44 | 361/732 |
| 8,925,262 B2 * | 1/2015 | Railkar | H02S 20/23 | 52/173.3 |
| 9,021,752 B2 * | 5/2015 | Schumacher | H02S 20/24 | 52/173.3 |
| 9,038,330 B2 * | 5/2015 | Bellavia | H02S 20/25 | 52/173.3 |
| 9,082,913 B2 * | 7/2015 | Karpovich | H10F 19/80 | |
| 9,166,523 B2 * | 10/2015 | Kiik | H02S 20/25 | |
| 9,187,639 B2 * | 11/2015 | Zheng | C08K 7/14 | |
| 9,187,903 B1 * | 11/2015 | Buzza | E04D 1/20 | |

(56) References Cited

U.S. PATENT DOCUMENTS

| | | | | |
|---|---|---|---|---|
| 9,231,123 B1* | 1/2016 | Sherman | H01L 31/02002 |
| 9,270,224 B2* | 2/2016 | Livsey | E04D 1/12 |
| 9,273,885 B2* | 3/2016 | Rodrigues | H02S 40/44 |
| 9,331,224 B2* | 5/2016 | Koch | E04D 1/26 |
| 9,391,223 B2* | 7/2016 | Langmaid | H01L 31/048 |
| 9,441,364 B2* | 9/2016 | Bertoldini | E04B 1/762 |
| 9,518,391 B2* | 12/2016 | Haynes | H02S 40/44 |
| 9,564,545 B2* | 2/2017 | Keenihan | H02S 20/25 |
| 9,683,757 B2* | 6/2017 | Palmieri | F24S 80/50 |
| 9,966,898 B1* | 5/2018 | Flanigan | E04D 1/12 |
| 9,991,412 B2* | 6/2018 | Gonzalez | B05C 11/1023 |
| 10,135,386 B2* | 11/2018 | Goldberg | F24S 40/00 |
| 10,256,765 B2* | 4/2019 | Rodrigues | F24S 25/20 |
| 10,280,624 B2* | 5/2019 | Lucas | E04D 1/12 |
| 10,511,253 B1* | 12/2019 | Britt | H01L 31/05 |
| 10,693,413 B2* | 6/2020 | Rodrigues | H02S 40/36 |
| 10,840,659 B2* | 11/2020 | Fukatsu | H01R 31/085 |
| 10,850,440 B2* | 12/2020 | Buckingham | B29C 41/32 |
| 10,854,999 B1* | 12/2020 | Price | H01R 13/659 |
| 10,855,221 B2* | 12/2020 | Perkins | E04D 12/004 |
| 10,858,839 B2* | 12/2020 | Haynes | E04D 13/00 |
| 10,923,680 B2* | 2/2021 | Cheng | B05D 7/56 |
| 10,982,445 B2* | 4/2021 | Jenkins | E04D 1/265 |
| 10,985,688 B2* | 4/2021 | Seery | H02S 20/25 |
| 11,097,513 B2* | 8/2021 | Giron | B32B 17/10036 |
| 11,773,644 B2* | 10/2023 | Gouge | B27N 7/005 52/784.1 |
| 11,807,750 B2* | 11/2023 | Stroh | H01M 8/0213 |
| 11,970,858 B2* | 4/2024 | Haynes | C04B 33/14 |
| 12,114,747 B2* | 10/2024 | Thiel | A41D 27/205 |
| 12,119,785 B2* | 10/2024 | Thiel | H10F 77/939 |
| 2001/0034982 A1* | 11/2001 | Nagao | H02S 20/23 52/173.3 |
| 2003/0034064 A1* | 2/2003 | Hatsukaiwa | H02S 20/23 136/251 |
| 2003/0154666 A1* | 8/2003 | Dinwoodie | E04D 1/20 52/173.3 |
| 2006/0179767 A1* | 8/2006 | Miller | B32B 5/30 52/555 |
| 2007/0295389 A1* | 12/2007 | Capps | B32B 17/10788 136/251 |
| 2008/0000512 A1* | 1/2008 | Flaherty | E04D 1/30 136/244 |
| 2009/0032093 A1* | 2/2009 | Fang | H10F 77/935 136/255 |
| 2010/0146878 A1* | 6/2010 | Koch | H01L 31/048 52/173.3 |
| 2010/0180523 A1* | 7/2010 | Lena | E04D 1/29 52/173.3 |
| 2011/0017278 A1* | 1/2011 | Kalkanoglu | H02S 20/23 52/173.3 |
| 2011/0049992 A1* | 3/2011 | Sant'Anselmo | H02S 10/12 307/64 |
| 2011/0162301 A1* | 7/2011 | Ueda | H10F 19/902 52/173.3 |
| 2011/0220180 A1* | 9/2011 | Cinnamon | H02S 30/10 136/251 |
| 2012/0137605 A1* | 6/2012 | Sibbett | E06B 1/34 52/204.1 |
| 2012/0199180 A1* | 8/2012 | Salam | F24S 25/11 248/65 |
| 2012/0210660 A1* | 8/2012 | Livsey | E04D 13/04 52/302.1 |
| 2012/0291848 A1* | 11/2012 | Sherman | H10F 77/63 136/246 |
| 2013/0043055 A1* | 2/2013 | Ma | H02G 3/16 174/59 |
| 2013/0118558 A1* | 5/2013 | Sherman | H01R 13/72 136/251 |
| 2014/0000708 A1* | 1/2014 | Keenihan | H01L 31/048 136/259 |
| 2014/0060649 A1* | 3/2014 | Stassen | H02S 20/24 136/259 |
| 2014/0373829 A1* | 12/2014 | Leighton | F24S 20/67 126/634 |
| 2015/0027516 A1* | 1/2015 | Rummens | B32B 17/10 136/251 |
| 2016/0010386 A1* | 1/2016 | Gouge | E06B 3/5892 49/506 |
| 2017/0027168 A1* | 2/2017 | Heath | A61P 17/00 |
| 2017/0126170 A1* | 5/2017 | Friedrich | H10F 19/807 |
| 2017/0248344 A1* | 8/2017 | Kauffmann | H02S 20/23 |
| 2018/0209149 A1* | 7/2018 | Schmidt | E04D 1/34 |
| 2018/0212566 A1* | 7/2018 | Lopez | F16B 45/00 |
| 2019/0109559 A1* | 4/2019 | Langmaid | F24S 25/40 |
| 2019/0214939 A1* | 7/2019 | Hall | H02S 20/23 |
| 2019/0379322 A1* | 12/2019 | Britt | H01L 31/049 |
| 2019/0386605 A1* | 12/2019 | Pao | F24S 25/10 |
| 2019/0386608 A1* | 12/2019 | Wares | H02S 20/25 |
| 2020/0182486 A1* | 6/2020 | Haynes | F24S 20/67 |
| 2021/0194412 A1* | 6/2021 | Ishida | H02S 20/25 |
| 2022/0167564 A1* | 6/2022 | Felton | A01G 9/033 |

FOREIGN PATENT DOCUMENTS

| | | | | |
|---|---|---|---|---|
| DE | 4227929 A1 | * | 3/1994 | E04D 1/30 |
| DE | 102019000326 A1 | * | 7/2020 | |
| EP | 0048982 A1 | * | 4/1982 | F24S 20/69 |
| EP | 1995791 A2 | * | 11/2008 | E04D 1/08 |
| GB | 2461797 A | * | 1/2010 | F24J 2/04 |
| WO | WO-2012028615 A2 | * | 3/2012 | B29C 70/86 |
| WO | WO-2012167965 A1 | * | 12/2012 | H01L 31/02013 |

* cited by examiner

LABOR SAVING SOLAR ROOFING SHINGLE

BACKGROUND

Field of the Invention

The present invention relates to an improved solar shingle that allows homeowner and roofer installation with normal tools and without training. The shingle has normal exposure and but uses advanced composite materials to allow nail-up installation, a design to allow simple series wiring and the use of high-efficiency photovoltaic or solar-thermal modules.

Description of Related Art

There are several solar shingles on the market today but they typically require precise alignment for wiring, fastening and to prevent water intrusion. These features, although they reduce material costs, drastically increase installation costs. With current low solar module costs, installation cost is now a significant portion of the overall cost of a solar roof. Dow Powerhouse™, CertainTeed Apollo®, Suntegra®, Tesla, Sanyo, GAF and Luma all have solar shingles but are they are not simple and intuitive to install.

The GAF solar roofing shingles which use moncrystalline solar modules mounted in metal frames are large and require 2 people to carry and install the panels. In addition, there are 5 different fasteners used to mount the panels as well as 7 different flashing and starting accessories. This system requires special training and more time for installation than standard roofing shingles causing the installed price to be significantly higher than it needs to be. The system is designed to be used with asphalt shingles around the edges and is not for the entire roof.

CertainTeed's Apollo® II shingles use monocrystalline solar modules mounted in a custom metal frame and install using a precisely aligned starting strip, gap tool, custom fasteners, special attention to wire management to avoid wire damage. The waterproofing is done through the special interlocking nature of the adjacent panels and with the flashing. These shingles are also designed to install with asphalt shingles around the perimeter of the solar array and are not for the entire roof.

Dow Powerhouse shingles use high efficiency solar modules mounted in a plastic or plastic composite frame. The shingles are low profile that mount directly to the roof deck and have precision interlocking features with adjoining panels and a headlap with very specific fastening points. The shingles have custom shingle-to-shingle series wiring connectors. The alignment and fastening methods require trained installers and are a relatively labor intensive.

Sanyo HIT solar shingles use monocrystalline solar modules mounted in a custom metal frame that interlocks with adjoining panels similar to the Apollow II shingles. The system uses custom flashing, fasteners and requires training for installation.

Suntegra uses polycrystalline solar module mounted to a composite frame with venting to increase cooling and efficiency. This system, like others, uses special flashing and fasteners that result in high installation cost.

Luma solar shingles also has a similar system with a solar module mounted in custom metal frame that interlocks with adjoining shingles for weatherproofing and has special flashing and fasteners. These shingles can be installed in conjunction with asphalt shingles, ceramic tiles, slate or wood shingles.

There are various products that use technology similar to that described in U.S. Pat. Nos. 4,040,867A and 8,215,071 with a tile-like structure and overlapping side and top with an embedded solar module. These tile like shingles use battens for installation like normal tile roofs and have wiring and fastening for each low-wattage shingle resulting in a slow and expensive installation.

US20110100436A1 shows a solar shingle with an improved method for series wiring with adjacent panels. This system requires precise alignment for fastening and wire connections.

PCT/US2010/040739 shows another version of a panel mounted in a specially designed frame that interlocks with adjacent panels and requires precise alignment and special fasteners for installation.

Patent application US20180122973A1 by Tesla is for a solar shingle with many of the attributes described in the prior art above but with the solar modules camouflaged with special glass. These shingles are designed for an entire roof with areas of the roof covered with false shingles that do not generate electricity. Installation is quite expensive with installers requiring certification. The solar shingles have an efficiency estimated to be about 10% which is quite low compared to other solar shingles that may be up to ~20%.

PCT/US2018/053575 describes a solar shingle made from a natural fiber thermoplastic composite material that can be installed without special tools or alignment however features for series wiring are not described. This technology describes a panel with a solar module adhered to a ribbed structure. Typically thermoplastic composites have low surface energies which make bonding or with adhesives difficult however.

The referenced current solutions that exist in the marketplace today, have difficult and time-consuming procedures for constructing solar roofs. They are labor-intensive to install and require skilled, expensive installers due to their need for precise alignment to prevent water intrusion and for structural integrity.

None of the previous inventions and patents, taken either singly or in combination, is seen to describe the invention as claimed herein. Hence, the present invention proposes solutions to resolve and surmount existent technical difficulties to eliminate the aforementioned shortcomings of prior art.

Definitions

The terminology used in this patent application is that same as used in the roofing industry.

Roofing shingles used as roof coverings consisting of individual overlapping elements that are typically rectangular shapes laid in rows from the bottom edge of the roof up along the roof surface, with each successive course overlapping the joints below. The headlap is the part of a shingle that is obscured during installation by the exposure of the shingle installed above it. Example dimensions of an asphalt composition shingle would be would be an overall width of 13 inches, an exposure of 5½ inches and headlap of 7½ inches. The nailing strip would comprise 2 inches of the headlap and would coincide with the top 2 inches of the headlap of a shingle installed underneath it. The width of a shingle is measured in a direction parallel to the slope of the roof and orthogonal to a row of shingles. The nailing strip is where fasteners such as screws or nails are applied to hold the shingle to the roof deck. The side of a shingle is where adjacent shingles are abutted during installation. A photovoltaic solar module is an assembly of glass, electricity generating solar cells and various layers of plastic sheeting to bind them together. Laterally is the direction along a row of shingles. Vertically is the direction parallel to the roof surface and orthogonal to the lateral direction. A course is a row of shingles. An offset is the dimension between sides of shingles in successive shingle courses. A junction box is the enclosed box containing wires from the solar cells.

DETAILED DESCRIPTION

FIG. 1 shows an exemplary embodiment of the solar shingle in the present invention and has the same basic components of normal asphalt or wood shingles a headlap (101), nailing strip (102), and exposure (103). The headlap, nailing strip and exposure have the same definitions, purpose and relative dimensions as traditional roofing shingles with the nailing strip being part of the headlap. The exposure in this invention has a solar module mounted in it however. The headlap, nailing strip and structure for the exposure are made from the same composite material in one contiguous piece though conceivably the shingle could be made in more than one piece and joined or fastened together.

FIG. 2 shows an exemplary embodiment of the configuration of the present invention wherein a photovoltaic (PV) module (201) is fixed to the exposure of the shingle with adhesive, clips, screws, rivets, pins or a combination thereof. The structure of the exposure can be comprised of ribs or a thin-web of composite material (202). While only ribs can be used for support of the exposure, a web of material can help distribution of material to the ribs during the molding process. Ribs on the underside of the shingle also provide space for a solar module junction box and wiring. There is a cutout in the exposure (203) to accommodate a PV module junction box. Ribs on the underside of a shingle may also have holes to aid in air movement under the shingle and convective cooling.

Adhering the solar module to a web will alleviate thermal contraction and expansion induced stress in the solar module layers due to temperature changes if the composite material used to form the shingle and web has a similar coefficient of thermal expansion (CTE) as the PV module tempered glass. Ideally the CTE of the composite material is less than $1.8 \times 10-5$ $C^{-1}$. This can be achieved with bulk molding compound (BMC) and sheet molding compound (SMC) formulations. BMC and SMC materials also have relatively high surface energies which allow reliable bonding with adhesives.

The typical PV module consists of layers (from top to bottom) of tempered glass, Ethylene-vinyl-acetate (EVA) encapsulant sheet, monocrystalline or polycrystalline solar cells, EVA sheet and a back-sheet made from a fluoropolymer or polyethylene terephthalate or a combination thereof. Alternatively a module which generates thermal energy from solar radiation can be mounted in the exposure in the same manner as a PV module with structural configuration that would accommodate a device that absorbs infrared radiation from sunlight and transmits it to a heat-transfer fluid.

To seal the edge of the PV module and help prevent water intrusion underneath the shingle and in-between the various layers in the solar module, an exemplary mounting feature shown in FIG. 3 shows a side of the solar module (301) with sealant in the gap (302) between the solar module edge and a lip (303) on the exposure frame. The frame is the outside perimeter of the exposure.

FIG. 4 shows an exemplary embodiment of a spring-loaded clip that may be used to fix a PV module to the exposure. The clip serves to hold the module down against the exposure structure and lip. This clip will not alleviate the need for sealant but will hold the module in place while an adhesive is curing.

The nailing or fastening strip (102) is normally wide enough to allow quick fastening of the shingle through without worrying about exact placement of the nail-gun or screw-gun head. FIG. 5 shows the nailing strip with screw insets (501) and the lip with inset (502) around the perimeter of the exposure for embedding and sealing the solar module. The screw insets allow the screw head to be recessed so it doesn't interfere with the exposure ribs of the shingle installed above it.

Suitable adhesives and sealants suitable for bonding the composite shingle structure to the back-sheet and multi-layered edge of the PV module may include flexible fast-curing adhesive such as silicone, polyurethane, or EVA. The adhesive should have good adhesion to the composite structure and glass, be UV, fire and moisture resistant and be able to handle temperature cycling stress caused by differences in thermal expansion and contraction between the PV module glass and the composite structure.

In addition to sealants, O-ring material or gaskets may be used to seal the PV module underside and edges from moisture intrusion. The PV module can also be mounted for easy removal with clips or a flange that holds the PV module in-place and against a sealing gasket or O-ring. It is best, but not necessary for a clip to not protrude from the side of the shingle. The PV module may also be fastened to the structure with pins protruding from the edges of the glass or border of the structure. One possibility is for pins around the border of the solar glass to snap into the structure underneath. These pins can be fused or adhered to the glass. Screws may also be used to fasten the glass to the structure. Ideally these pins or screws would have a CTE similar to that of the glass (e.g. Titanium screws). With pins or screws fastening the glass to the support structure borders around composite receptacle may not be necessary and would give the roof a more uniform appearance.

To facilitate water shedding and prevent lateral movement of water, small grooves or ridges can be molded into the headlap. The headlap may also be smooth to facilitate printing, engraving or embossing for advertisement purposes or instructions, for example.

FIG. 6 shows an exemplary embodiment of the underside of the PV shingle with a ribs supporting the headlap (601), nailing strip (602) and exposure (603). A composite material for the structure with sufficient stiffness will allow the shingle to resist significant wind uplift of the exposure and pass the desirable ASTM D3161 Class F, 110 MPH testing requirements. The structure will also provide toughness necessary for handling and installation and protect the PV module from damage.

Ribs on the underside of the nailing strip (602) will aid in absorbing the impact of a nail-gun, withstand the force of screws fastening the shingles to a roof deck as well as help the shingle resist wind uplift. The nailing strip of an installed shingle aligns with a ribbed area at the top of the headlap under it. Most thermoplastics do not have the impact strength to allow pneumatic nailing and with thermoset composites like BMC or SMC the formulation needs to be sufficiently tough and the thickness of the nailing strip needs to be thin enough to allow pneumatic nailing and provide easy screw penetration.

To facilitate wiring, FIG. 7 shows exemplary embodiments of cutout passages in the ribs on the underside of a PV shingle to pass wiring from the PV module junction box up through the nail-strip to the headlap (701) and out laterally (702) to the sides of the shingle for connection to adjacent shingles. The cutouts may be sized to tightly hold the wiring to prevent them falling out and being pinched, cut or abraded during installation or transport and a sealant may be used to adhere the wires to the passages. It is also important to have an area for wiring adjacent shingles in series that is easy to access and not exposed to the elements. Underneath an overhang (703) on each side of the shingle's headlap can provide an area for wiring that is protected from the weather. The overhang can also extend through the entire side of the shingle including the nailing strip and exposure. A microinverter can be mounted under the overhang also if desired.

The overhanging side of each shingle will obscure any connection when the shingle sides are butted together before fastening to the roof deck. FIG. 8 shows an exemplary embodiment of the underside of the overhang of two adjacent shingles with the PV module junction box (801), and wires with polarity (802) from the junction box going to a series connection (803). The abutting shingles do no need to be perfectly aligned to achieve a functioning series wire connection and shingle installation.

The series connection between adjacent panels can be made with a variety of methods including using a parallel insulated crimp connector and or a soldered connection with heat-shrink insulation for example. The connection can also be made with a two-wire parallel bullet push-fit connector union that can be free floating or be fixed to the underside of the overhang with adhesive or a clip. FIG. 9 shows an exemplary embodiment of a union with male (901) and female (902) bullet connections in a parallel orientation mounted in an insulated housing so that two wires with connectors of opposite polarity may join the connector with an approach of the same direction. This connector can be made waterproof with O-ring seals and have a locking mechanism, for example, however water resistance is not necessary because the connections are shielded from the elements and the connector is inaccessible when installed. This connector can be fixed to the underside of the headlap overhang to facilitate connections or be free-floating. The connector should be made of heat and an arc-resistant plastic or ceramic material.

Underwriters Laboratories (UL) standard 4703 wire that is normally used for connecting PV modules is quite stiff and not amenable to small radius convoluted wiring required in this application. Silicone sheathed wiring such as that specified in UL standard 3135 with thinner sheathing and larger numbers of wires in the bundles than normal PV shingle wiring may be used to facilitate tight bends while having sufficient arc and fire resistance. During transportation and maneuvering it is important that the PV module connecting wires be fixed to the shingle and not be loose and potentially getting caught on something or interfering with the installation process. To facilitate this, the wires are fastened to the underside of the lip with a hot-melt adhesive or other non-permanent adhesive or clips so that when the wires need to be connected they can be pulled from their fastening device and maneuvered to connect to the adjacent shingle or at the end of a row of shingles be passed through a hole in the roof surface for connection in the space below the roof surface such as an attic.

The shingles are designed to fasten to an existing shingle, slate, wood or tile roof with screws or nails and a starting shingle is for the first course of shingles. FIG. 10 shows an exemplary embodiment of a starting shingle which does not have a PV module but has a taper (1001) which sets the angle of the subsequent courses of shingles so the exposure lays flat on the headlap of the shingle beneath it. The starting shingle fastens to the roof deck through a nailing strip (1002). The starting shingle can be made out of the same material as the PV shingle structure or any other UV and fire resistant material with a similar CLTE as the shingles with the PV modules. The starting shingle can have ribs on the underside or be hollow as long as the top surface does not permit water penetration.

FIG. 11 shows the side view of an exemplary embodiment of a PV-shingle installation with the roof deck (1101) which can be covered with shingles, the starting shingle (1102) and the PV shingles (1103).

FIG. 12 shows another view of an exemplary embodiment of the layout of a PV shingle (1202) installation. The top or last row of shingles in an installation uses shingles (1203) that are cut from a full shingles or are a custom fabrication so they only have an exposure and nailing strip. The top suingle uses 'Z' profile flashing (1204) to seal and cover the nailing strip and in the case of shingles with normal headlap like asphalt shingles, wood shingles, slate, etc.; interleave with the course of roofing shingles installed above it. Many other configurations of flashing will suffice to seal the top row of PV shingles and are commonly fabricated for flashing roof penetrations in metal, asphalt, tile and wood roofing. In the case of a tile roof the flashing would match the undulation of the tile. Normal roofing sealant is used to seal the flashing on the nail strip as well as the interleaving with the row of non-PV roofing shows how they are arranged on a roof deck.

In the case of PV shingles applied on-top of existing roofing it is easiest to install shingles with them aligning vertically. With this arrangement it is necessary to waterproof the junction between two shingles to avoid water flow between shingles and down to the roof deck. Waterproofing can achieved with a waterproof tape or by fastening a small thin UV resistant, fire resistant and waterproof sheet between the shingles over the headlap. FIG. 13 shows an exemplary layout of shingles utilizing a small waterproof sheet (1301) to cover the joint between the headlap and nail-strip in two adjoining shingles. This sheet can be glued, nailed or stapled to the headlap.

While the overhanging headlap sides might be convenient for wiring, they may allow lateral water penetration due to wind driven rain under the shingles installed at the end of the courses. To prevent any possible water intrusion flashing may be useful to fasten to the side of the shingles and/or the roof deck. An 'L' style flashing can be used where one leg goes under the shingle side, or lays flat on the roof surface and the other leg is adjacent to the side of the shingle. Screws, adhesive and overlapping the flashing may be used to fasten the flashing similar to methods used to install flashing in asphalt and wood roofing installations.

The PV shingles may also be installed more like traditional shingle roofing with offset courses to prevent alignment of junctions between shingles. This will alleviate the need for waterproofing sheets covering the joints. To achieve this it is necessary to use shingles the width of the offset to fill in the space at the end of the row. Specially molded shingles with or without PV modules can be used for these shingles.

Instead of installing an array of PV modules (like described above) on top of existing asphalt or wood shingles or tiles, a more uniform roof appearance may be achieved with the use of shingles without functioning PV modules but with glass that has the appearance of a PV module. These false shingles with glass can be cut in the field with a diamond-tooth saw blade for fitting around the roof edges, ridge and roof penetrations.

The functioning and fake PV modules may use glass that is frosted to reduce reflection as well as be pigmented to match a particular color scheme. While this may reduce efficiency it may improve aesthetics.

In addition to sufficient structural integrity, the ideal material for the molding a shingles would have fire resistance, UV resistance and have a CTE close to that of the PV module glass ($\sim 8\times10^{-6}$ $C^{-1}$). This low CTE can most easily achieved with a bulk molding compound (BMC).

Both BMC and sheet molding compound (SMC) both can have CTE's similar to PV module glass, though BMC flows better and is easier to mold into complex shapes. The 6063 Aluminum alloy typically used in solar panel framing has a significantly higher CTE than PV module glass at about $2.3\times10^{-5}$ $C^{-1}$. Similar CTE's reduce stress on fasteners, sealants and gaskets and allow the construction of a PV shingle without costly aluminum frames.

UV resistance is important due to the desired longevity of PV shingles of greater than 10 years. Carbon black is an effective UV and heat stabilizer if it can be adequately dispersed in the resin. While hindered amine light stabilizers (HALS) are not known to be particularly effective in the unsaturated polyester resins used in BMC and SMC formulations, benzophenones can be effective. A system of UV stabilizers, antioxidants and heat stabilizers can be included in the formulation based on current technology known in the industry.

Fire resistance of SMC or BMC can easily be achieved by Aluminum Trihydrate (ATH) or Magnesium Hydroxide for a portion of the filler at a composition of up to 30%. Rice hulls which have about 20% silica content can also help with fire resistance.

To prevent the damage of the PV cells by static discharge, the material for construction of the shingle should dissipate charge with a surface resistivity of between $10^5$ and $10^9$ $\Omega$/sq. Carbon black at up to 3% of the formulation and other conductive particles in the formulation can help in this regard.

Because material stiffness and strength isn't of the utmost importance in the shingle composite material, natural fibers may be substituted for the mineral fillers and glass fibers in the composite formulations at up to 50%. Natural fibers that may be substituted include those from hemp, kenaf, wood, cotton, jute, flax or any other natural fiber of similar strength. Low-cost and lightweight fillers that can substitute for calcium hydroxide, alumina, calcium carbonate and other inorganic fillers in a formulation that may suffice include rice hulls, rice hull ash and waste fiber dust or other particles that have high silica content (>10%) so that they aid in fire resistance. These fillers can be added at up to 70% of the formulation.

An exemplary embodiment of a BMC formulation that can meet UL 790 Class A fire specifications and ASTM D3161 Class F wind rating in this application contains 24% polyester resin, 0.2% dicumyl peroxide, 0.5% zinc stearate, 15% magnesium hydroxide, 15% hemp fiber, 2% carbon black and 43.3% ground rice hulls.

Analogous to a PV modules mounted in the exposure of a shingle, a module that absorbs solar infrared radiation (IR) can be mounted in the exposure. The configuration of ribs in the exposure would likely be adjusted to accommodate a solar IR absorbing device.

For a solar-thermal module, the top surface could be an IR transmitting glass with a reservoir below the glass that absorbs thermal energy and transfers it to a fluid. Ideally the fluid would not freeze or have a significant vapor pressure when installed on a roof and have a low Prandtl number for optimum heat transfer. The surface for IR absorption ideally would have a high ratio of solar absorptivity to emissivity ratio such as steel coated with Copper Oxide (CuO). There are a wide variety of materials that will serve this purpose of which CuO is an example.

Tubing transferring fluid to and from each shingle may be connected in series with adjacent shingles or pass through the roof surface above the nailing strip into the attic analogous to the PV shingle described above. The tubes could be from corrugated metal like that used to connect hot water heaters to allow easy routing underneath the shingle, to adjacent shingles and to the attic. The solar thermal module shingle may also use a parallel tube union analogous to that described to connect the tubes from adjacent shingles in FIG. 9 that can have solder connections, quick connects or fittings with flared compression fittings. This connector can also be fixed to the underside of the headlap overhand with screws or adhesive or clips and should be made of a heat-resistant, dimensionally stable plastic or metal. Also, the appearance of a solar-thermal shingle be made to look like the PV shingles with similar glass as the PV shingles resulting in a roof with uniform appearance if desired. While the exposure of a solar-thermal module can have a ribbed structure to support it, to maximize heat storage and collection capability the entire heat collection tube array and any manifold may suffice as the structure.

The solar-thermal module may be a series of tubes attached to a manifold at each end of the shingle or a single tube passing back and forth under the exposure with an exit and entrance at opposite sides of the exposure. FIG. 15 shows an exemplary embodiment of a solar-thermal module with an IR transmitting glass plate (1501) which would mount similar to that of the glass of a PV module, a bracket (1502) that supports the glass and or the tubes, and tubes (1503) that both absorb IR radiation and convey the heat-transfer fluid inside the tubes.

FIG. 16 shows an exemplary embodiment of a solar-thermal module with an array of tubes (1602) mounted in the exposure of a solar shingle with a manifold (1603) connecting them and a corrugated tube (1604) transferring the heat transfer fluid to the headlap at each end of the shingle.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of constructing an energy generating solar roof.

Significant features of this invention include a composite solar shingle with embedded PV module or solar-thermal module, a shingle structure that has an overhanging headlap side for facilitating shingle to shingle connections, a novel parallel wire connector, a low CTE and low cost BMC formulation and the use of flexible silicone sheathed wiring for wire routing and corrugated tubing for solar-thermal module connections.

Figure 1:
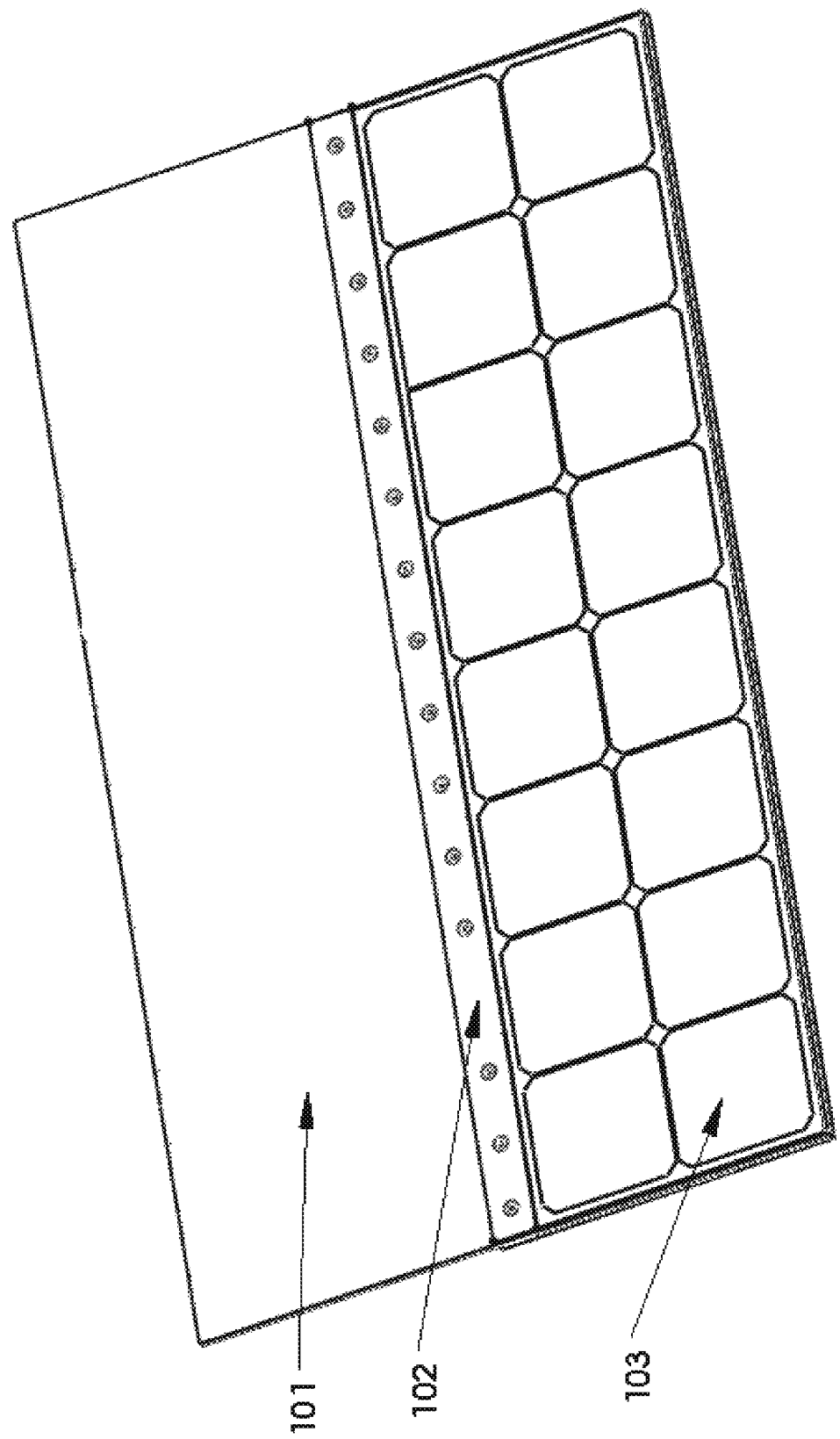
FIG. 1 shows an exemplary embodiment of a PV shingle with headlap (101), nailing or fastening strip (102) and PV module fixed to the exposure (103)
Figure 2:
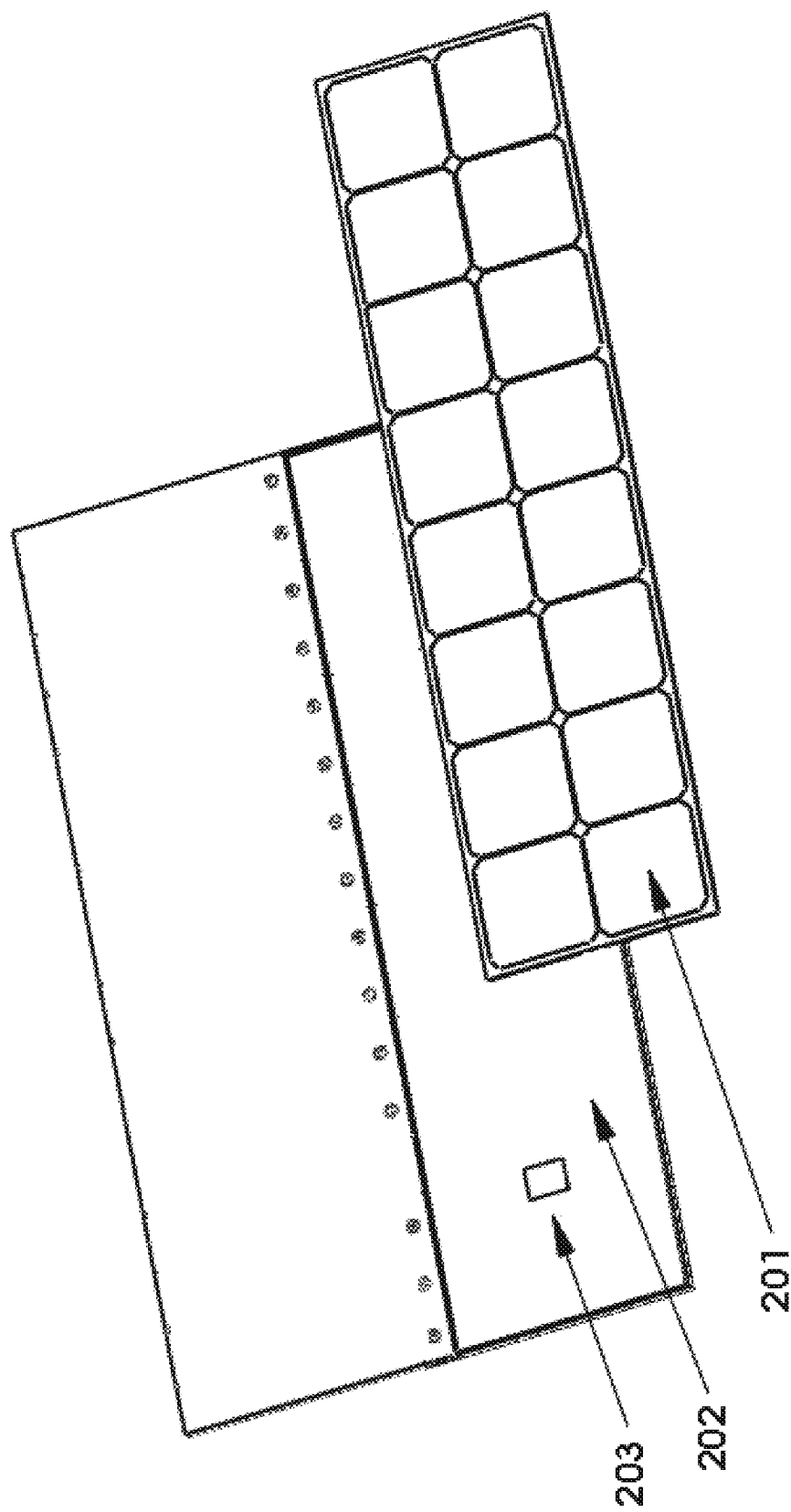
FIG. 2 shows an exemplary embodiment of an electricity generating PV shingle with a typical PV module (201) fixed to the structure of the exposure (202) and with a cutout (203) to accommodate the PV module junction box.
Figure 3:
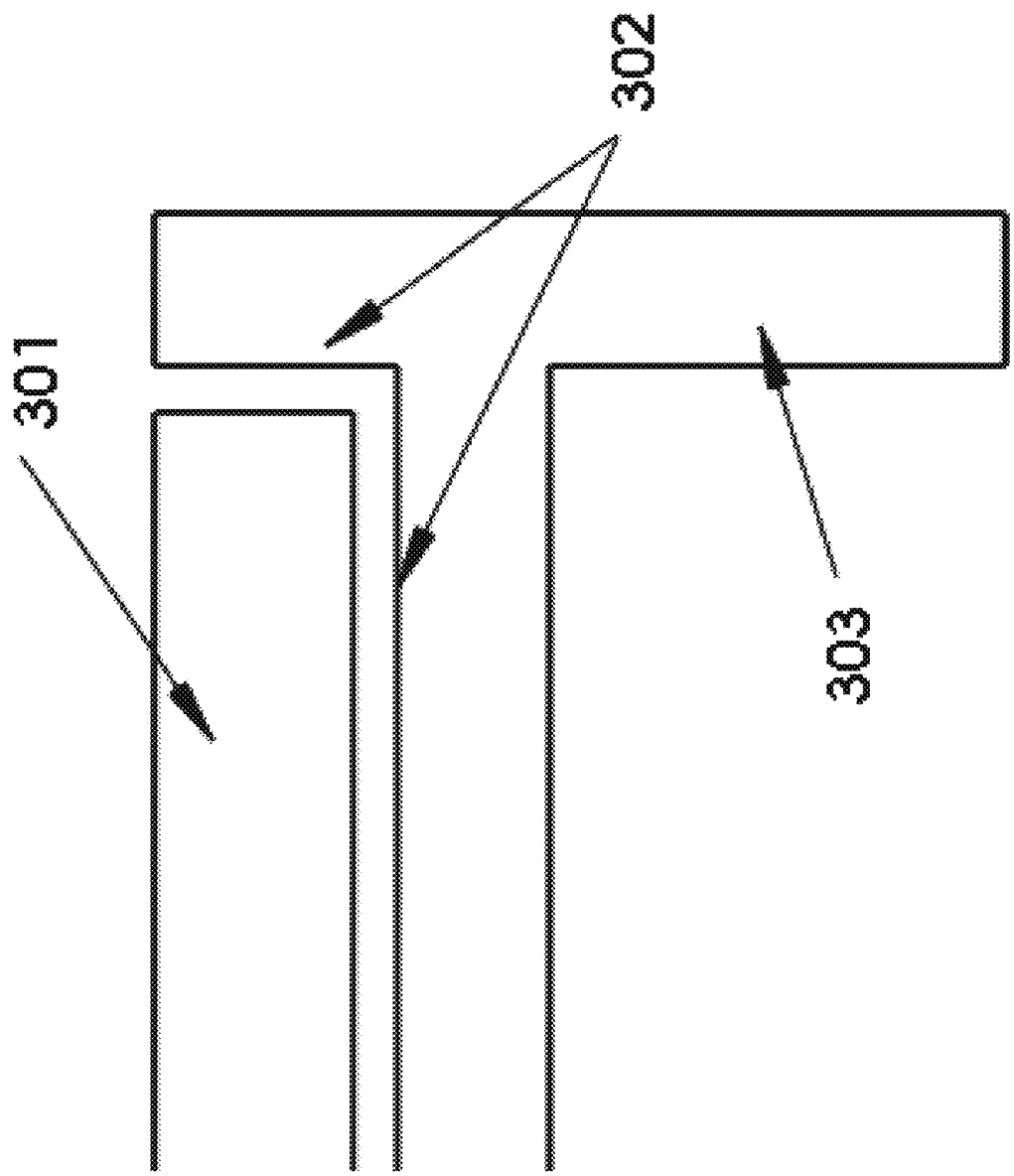
FIG. 3 shows an exemplary embodiment of a how a PV module (301) is fixed to the composite PV shingle structure (303) with a gap for adhesive (302).
Figure 4:
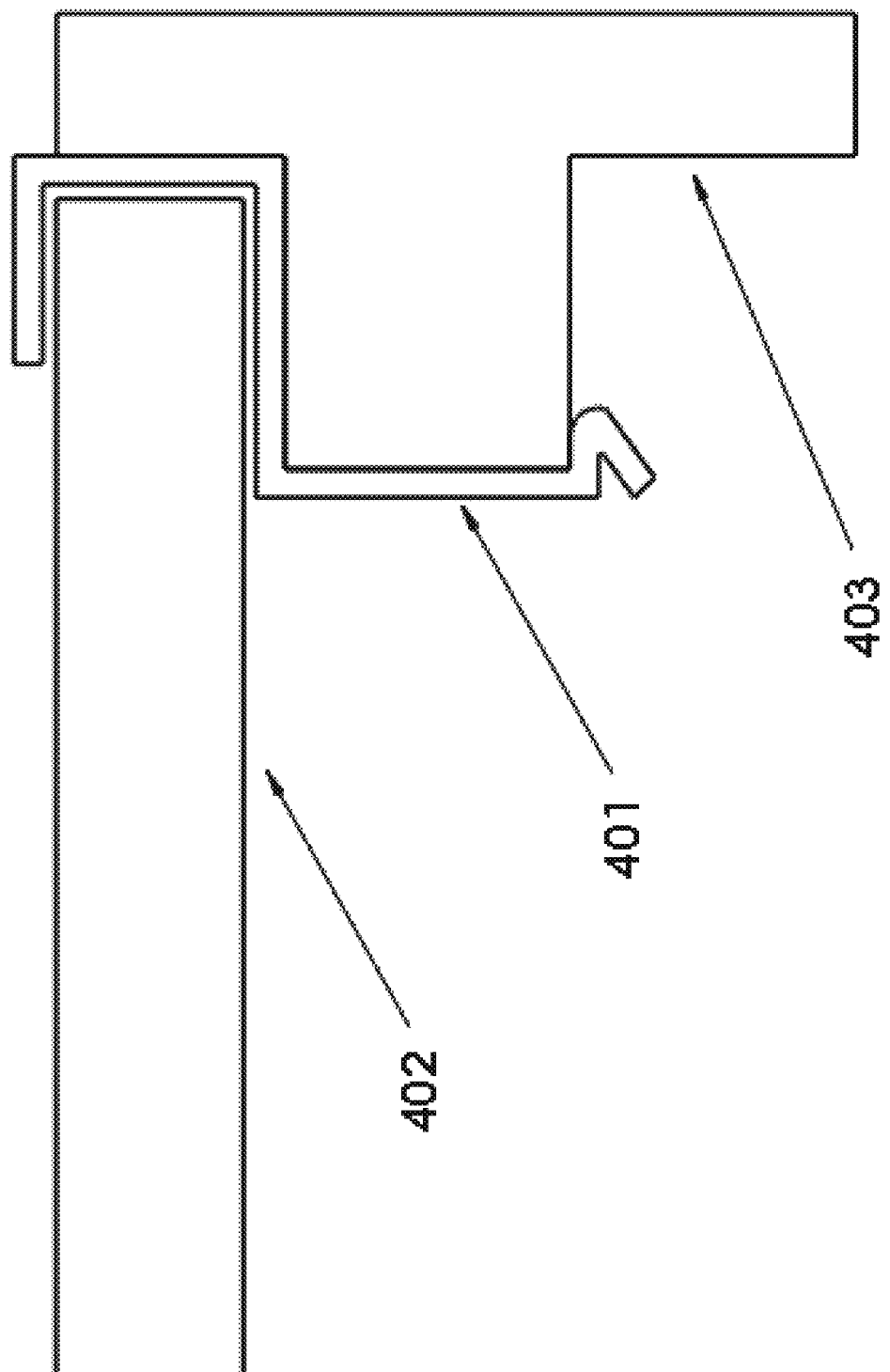
FIG. 4 shows an exemplary embodiment of a spring-loaded clip (401) used to fasten a PV module (402) to the composite shingle structure (403).
Figure 5:
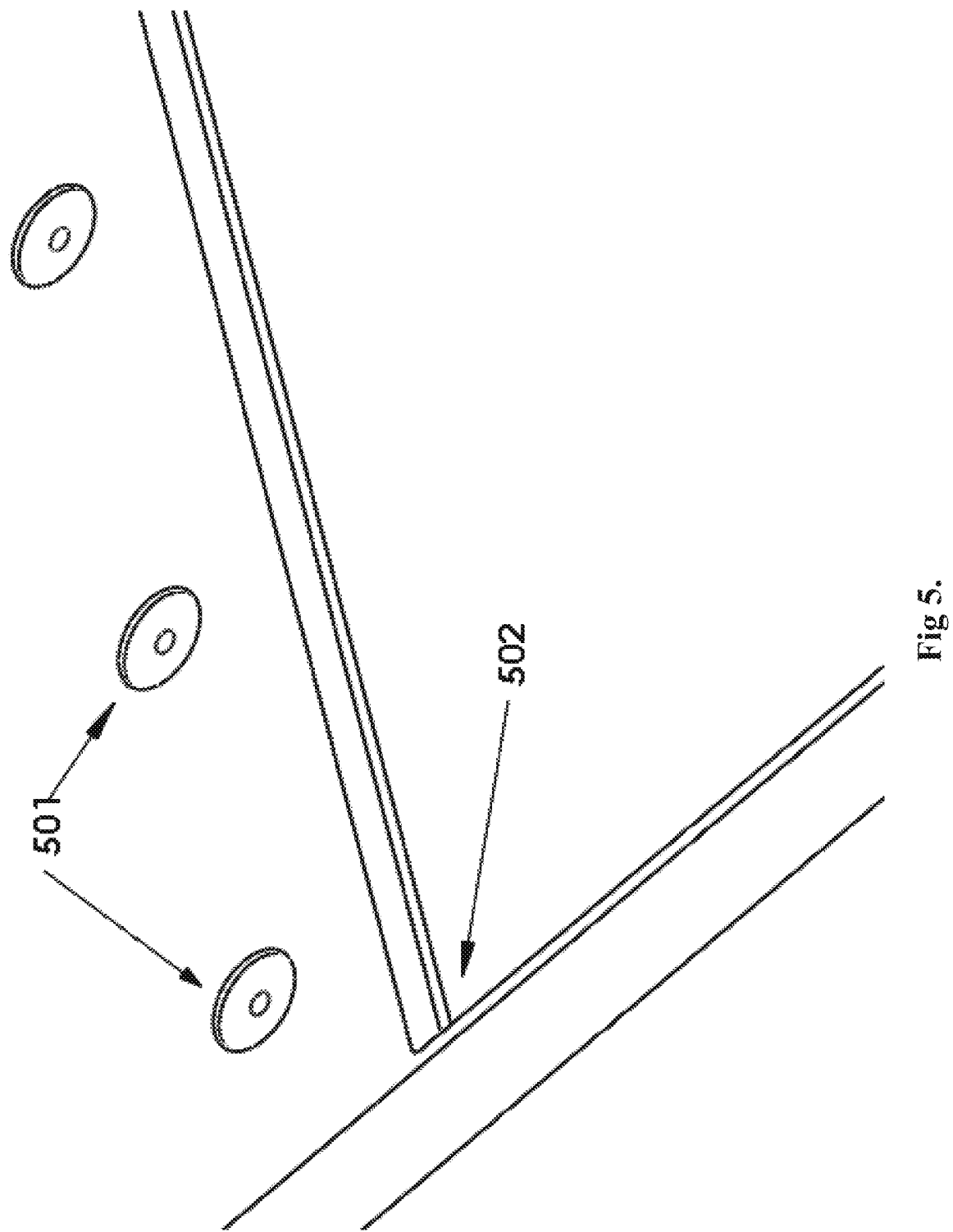
FIG. 5 shows an exemplary embodiment of insets in the nailing strip (501) to accommodate typical roofing screws with washers as well as the inset (502) in the exposure to accommodate a PV module so that it is flush with the exposure frame, nailing strip and headlap.
Figure 6:
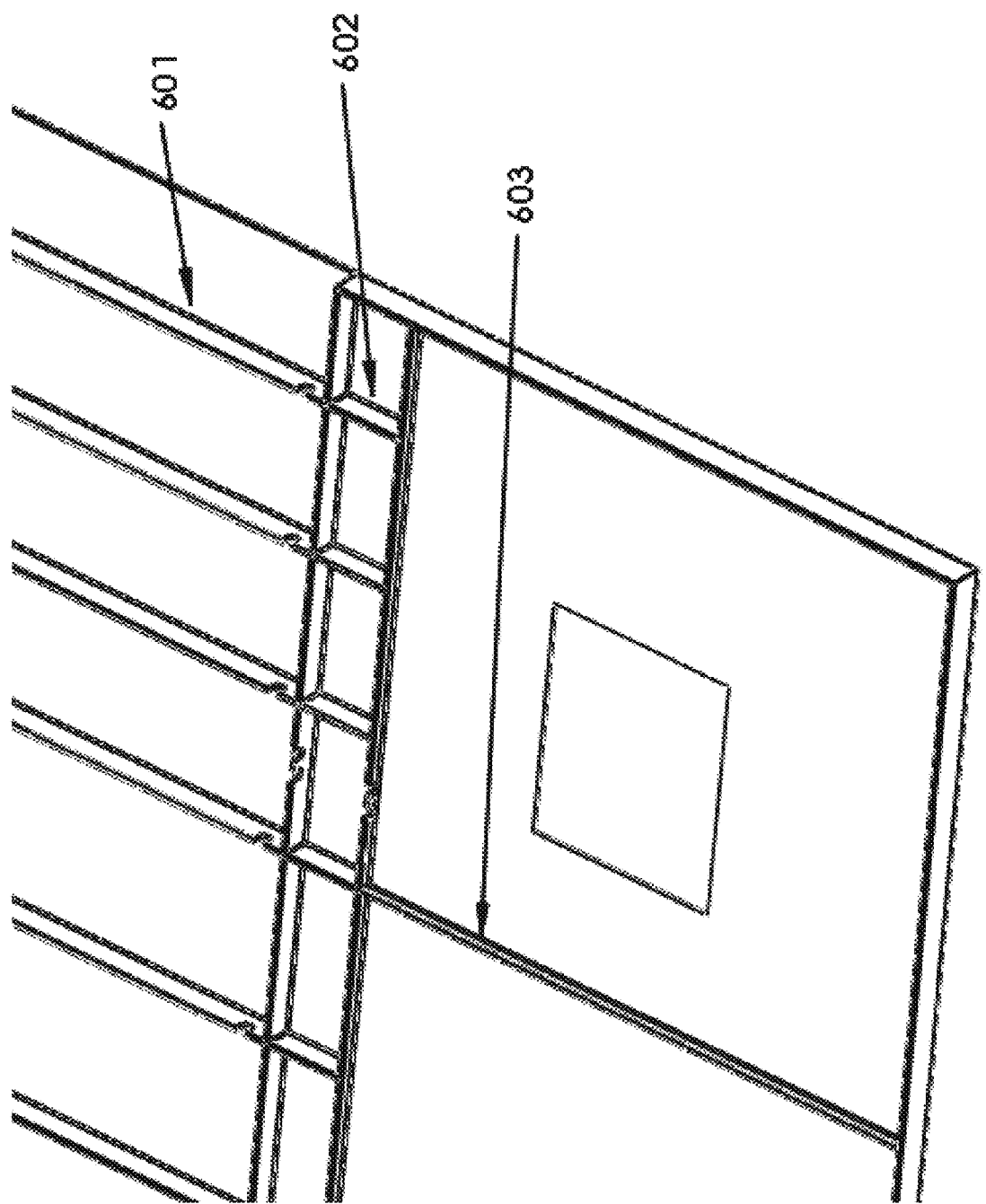
FIG. 6 shows an exemplary embodiment of the structure on the underside of a PV shingle with headlap ribs (601), nailing strip ribs (602) and exposure ribs (603).
Figure 7:
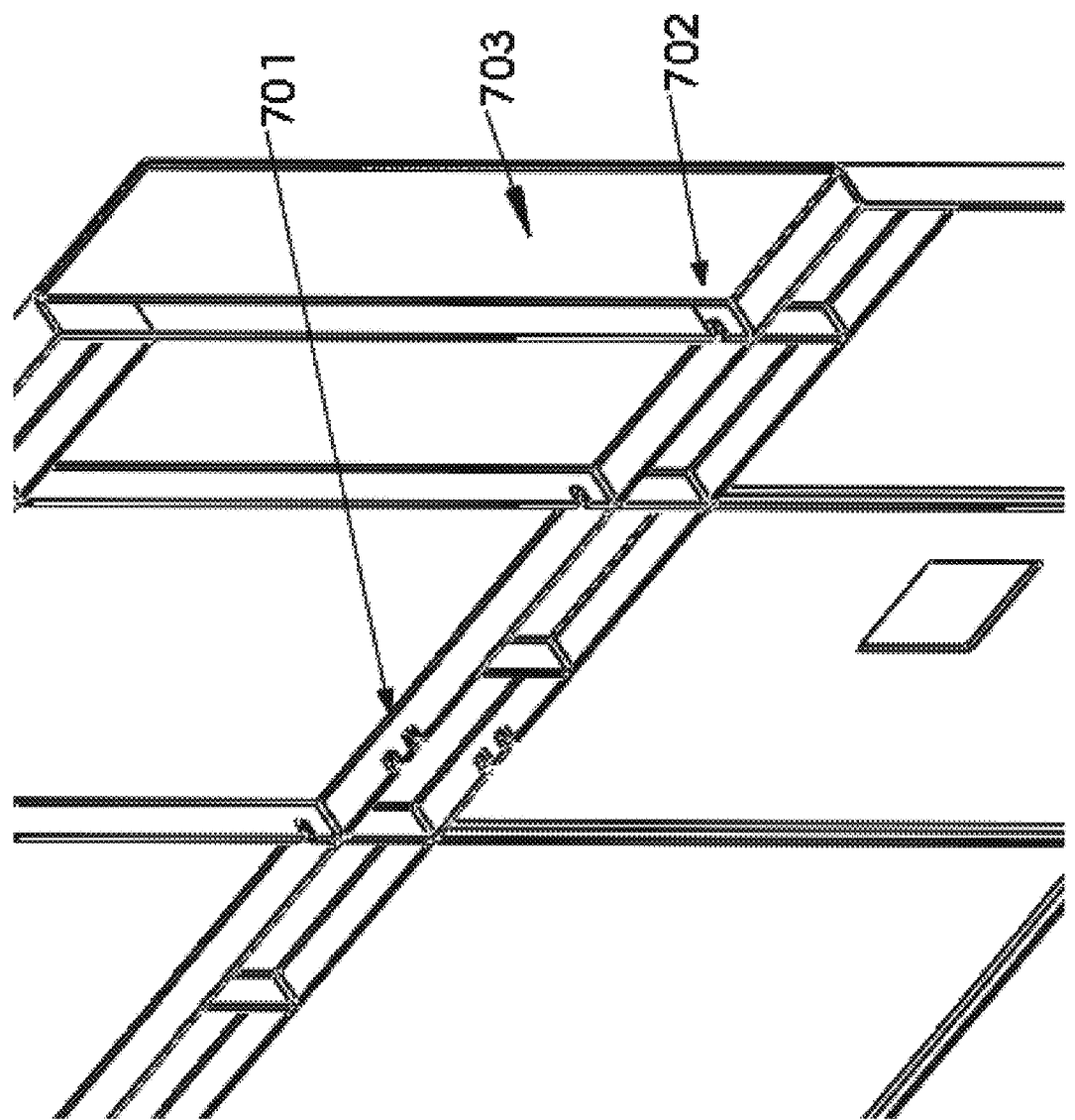
FIG. 7 shows an exemplary embodiment of features for routing PV module wiring with cutouts to allow wires to pass to the headlap through the nailing strip (701), cutouts to allow wires to pass laterally to the sides of the shingle (702) and an overhang (703) in the headlap to facilitate series wiring of adjacent panels
Figure 8:
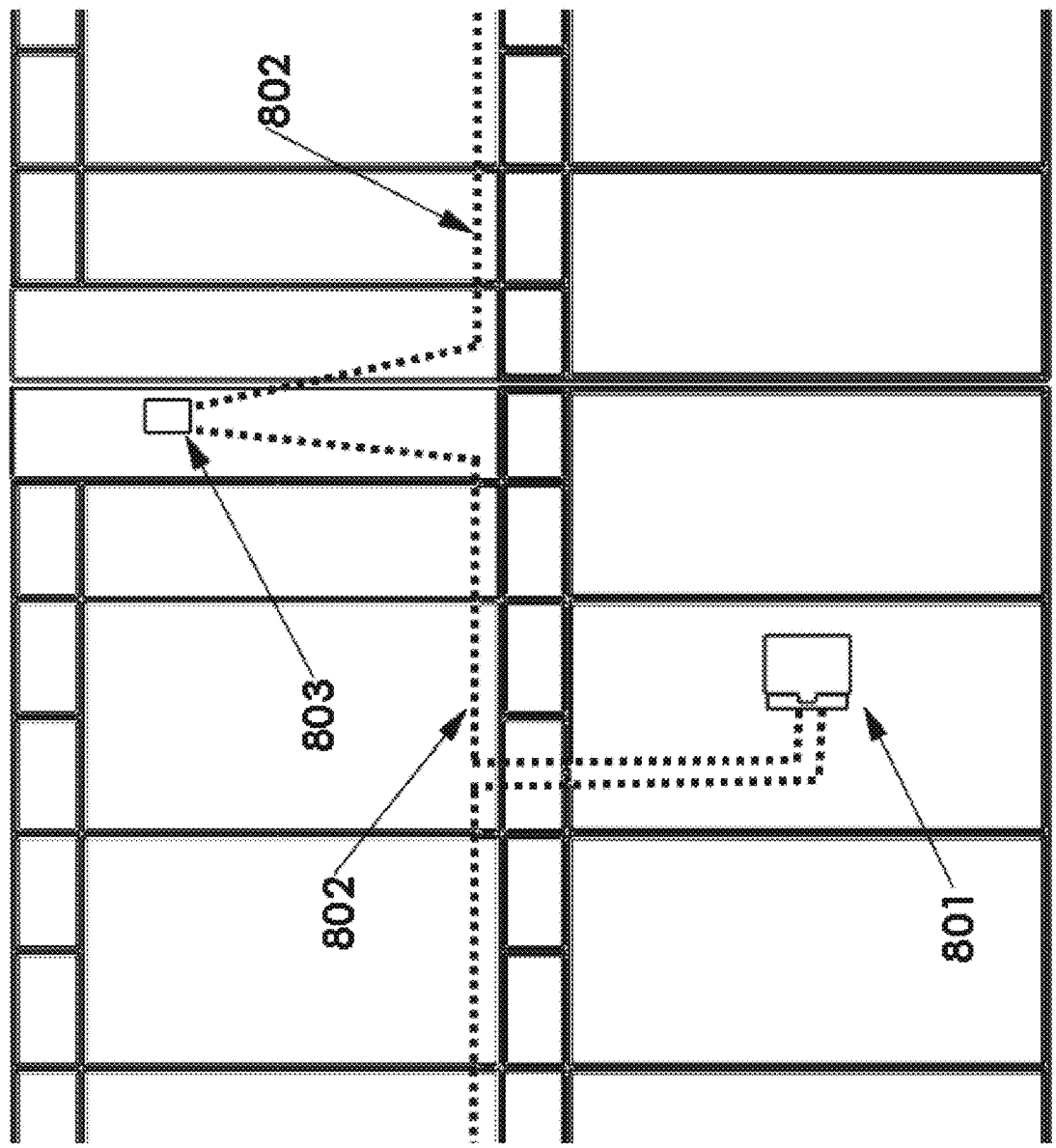
FIG. 8 shows an exemplary embodiment of shingle wiring with wires exiting the junction box (801), transiting to the headlap and routing laterally (802) to a series connection under the overlap in the headlap (803).
Figure 9:
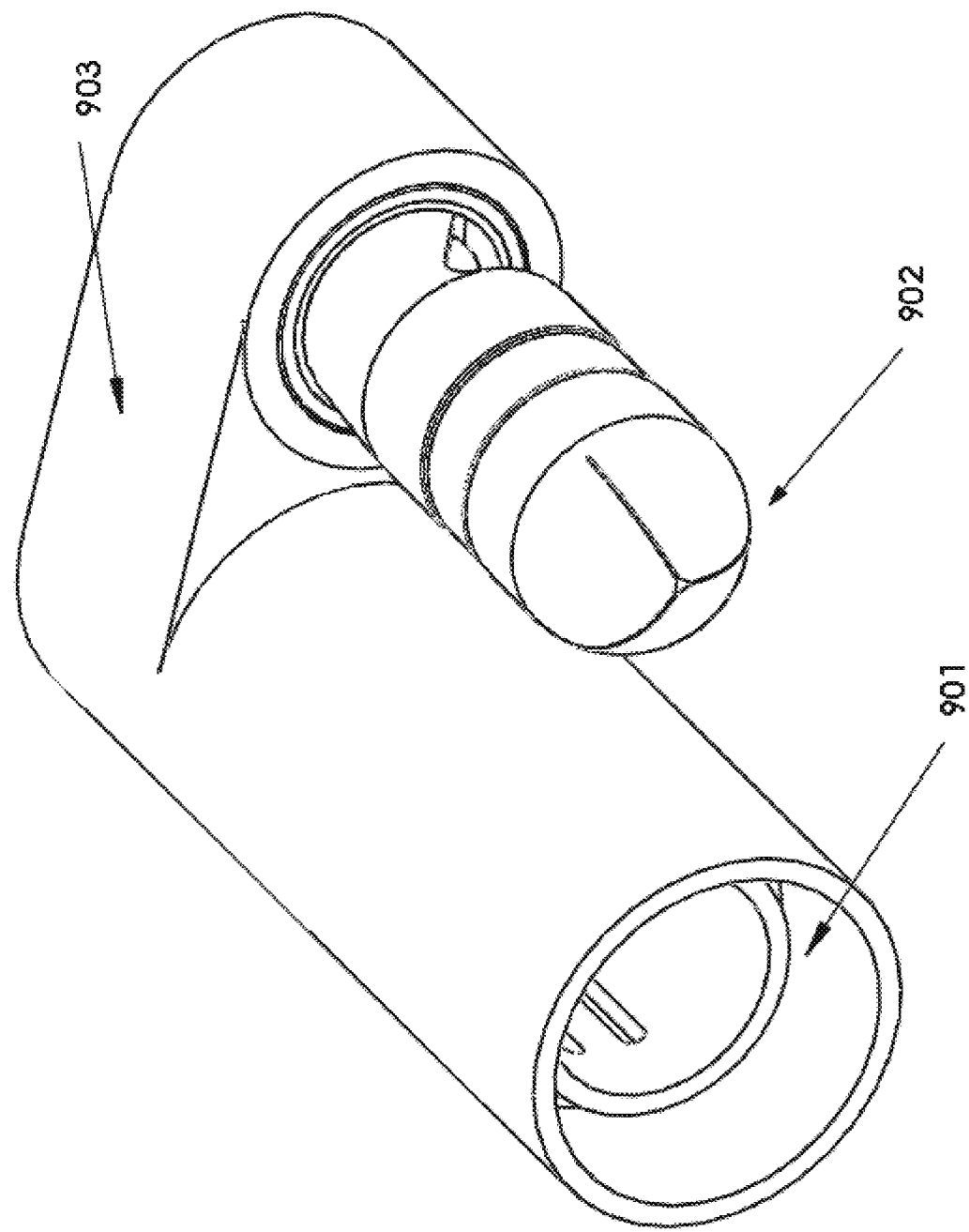
FIG. 9 shows an exemplary embodiment of a parallel wire series connector used to connect adjacent shingles with a female bullet connector receptacle (901), a male bullet connector (902) and an insulated housing (903) containing a conductor joining the male and female bullet connectors.
Figure 10:
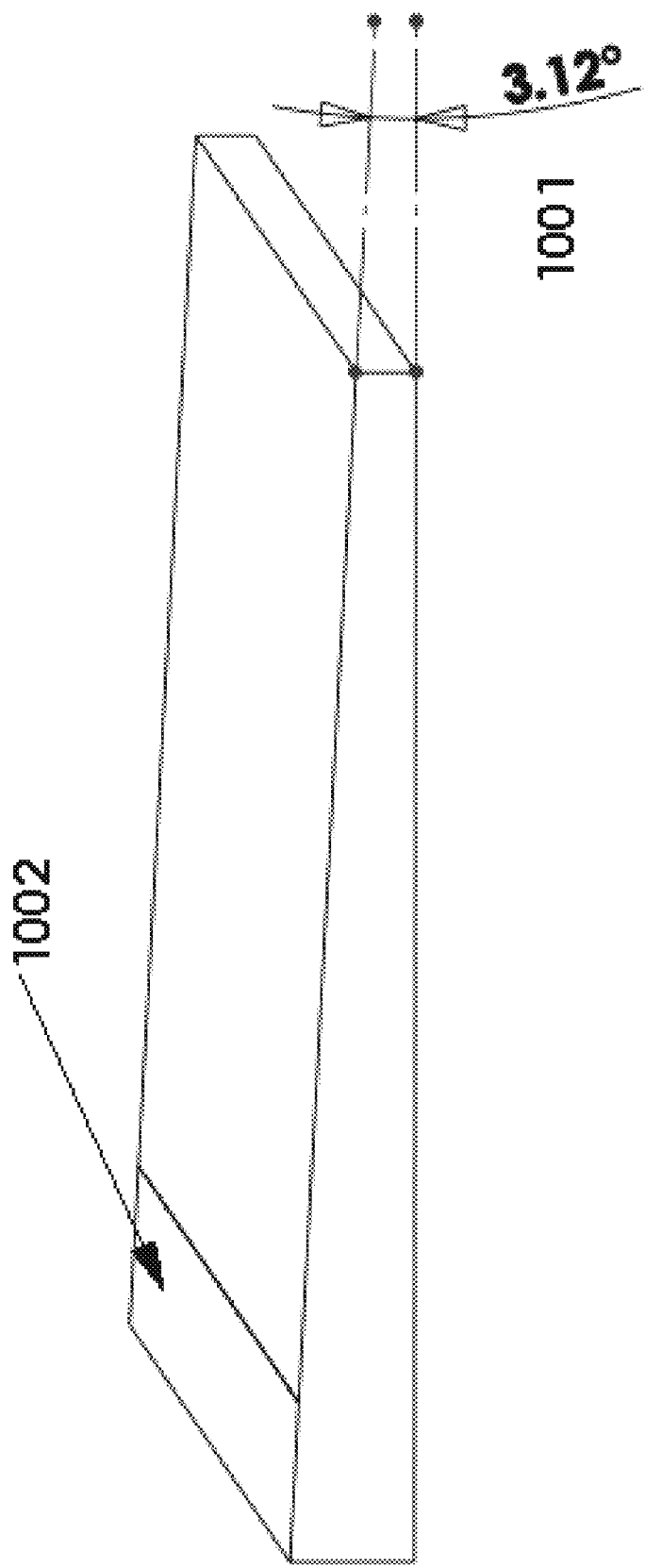
FIG. 10 shows an exemplary embodiment of starting shingle with taper (1001) and nailing strip (1002).
Figure 11:
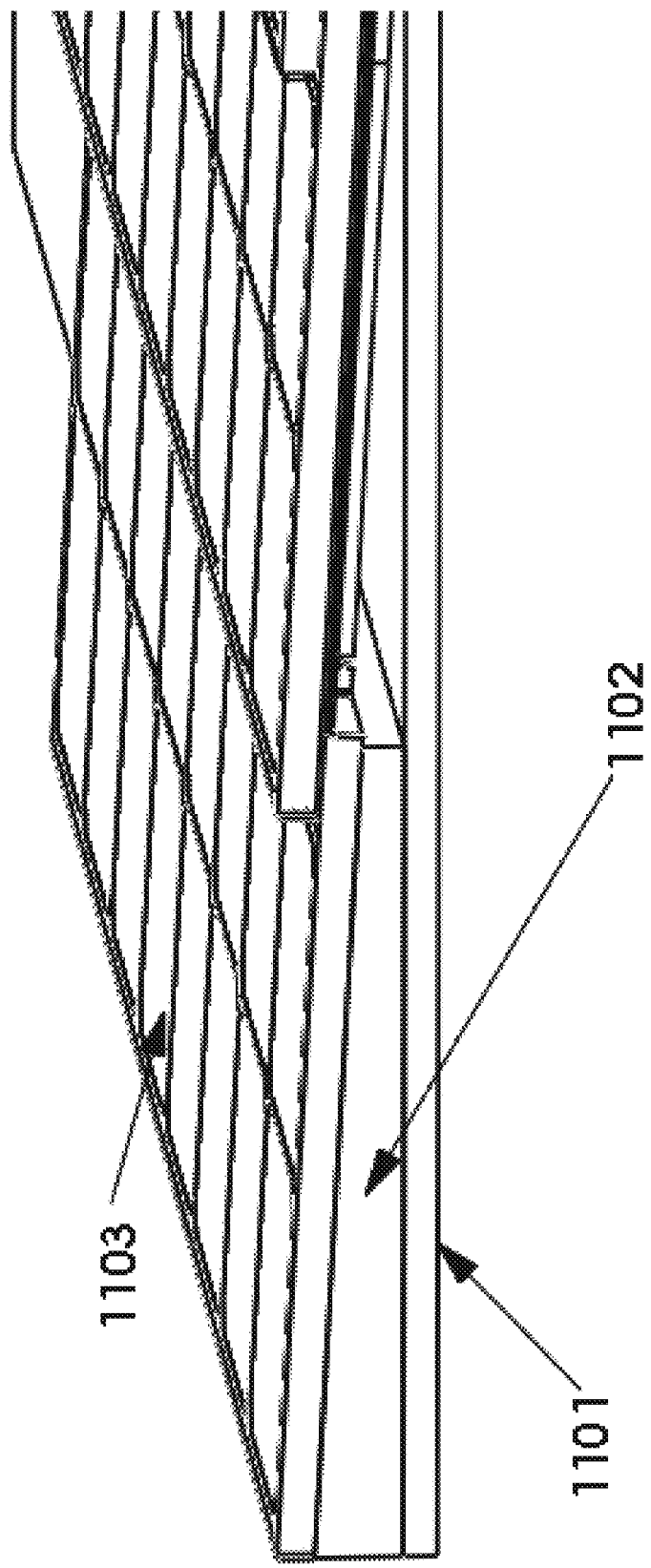
FIG. 11 shows an exemplary embodiment of the layup of a PV shingle installation with the roofing deck (1101), starting shingle (1102) and PV shingle (1103).
Figure 12:
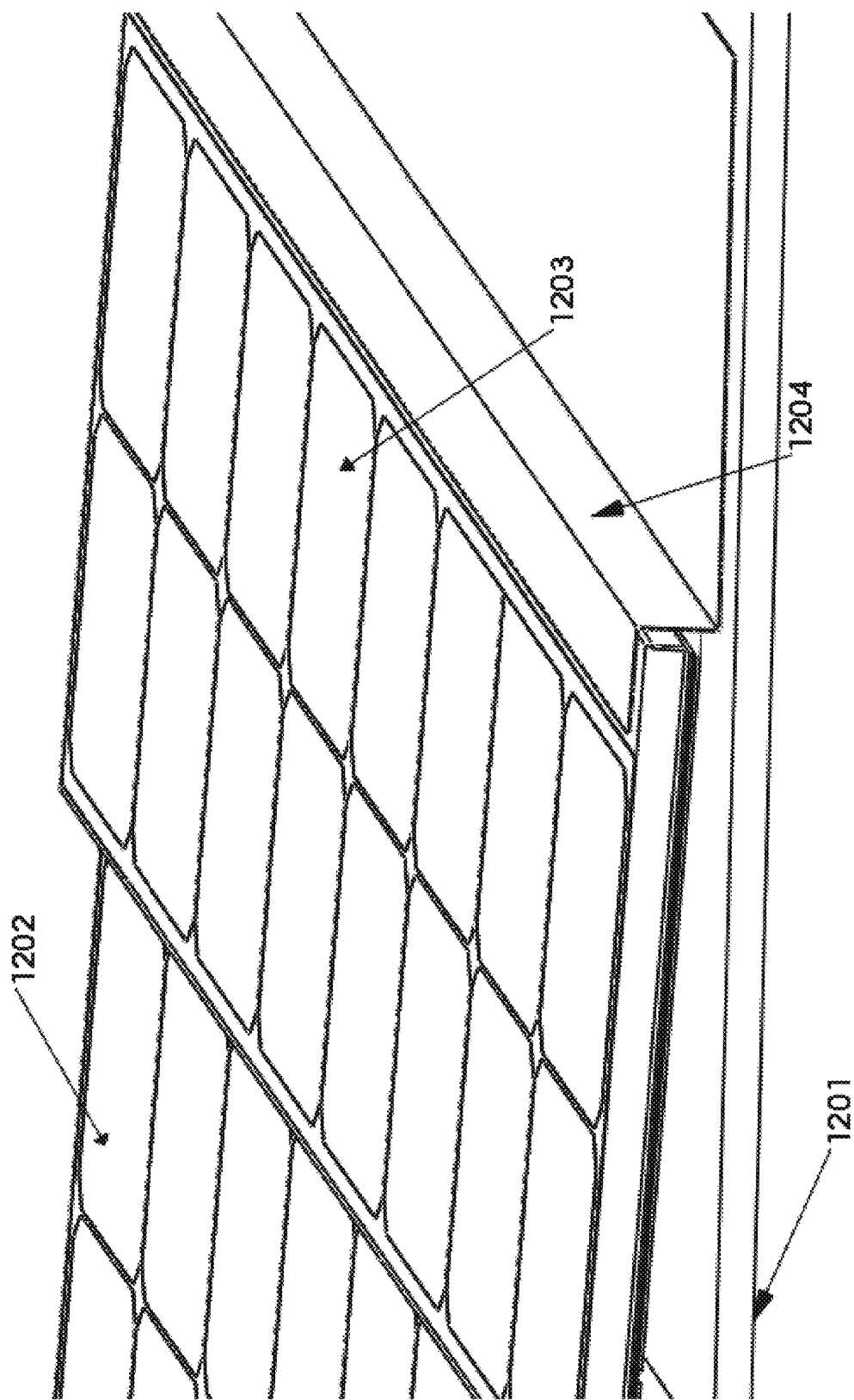
FIG. 12 shows an exemplary embodiment of the layup of a PV shingle installation with the roofing deck (1201), PV shingle (1202), top course shingle (1203) and flashing (1204).
Figure 13:
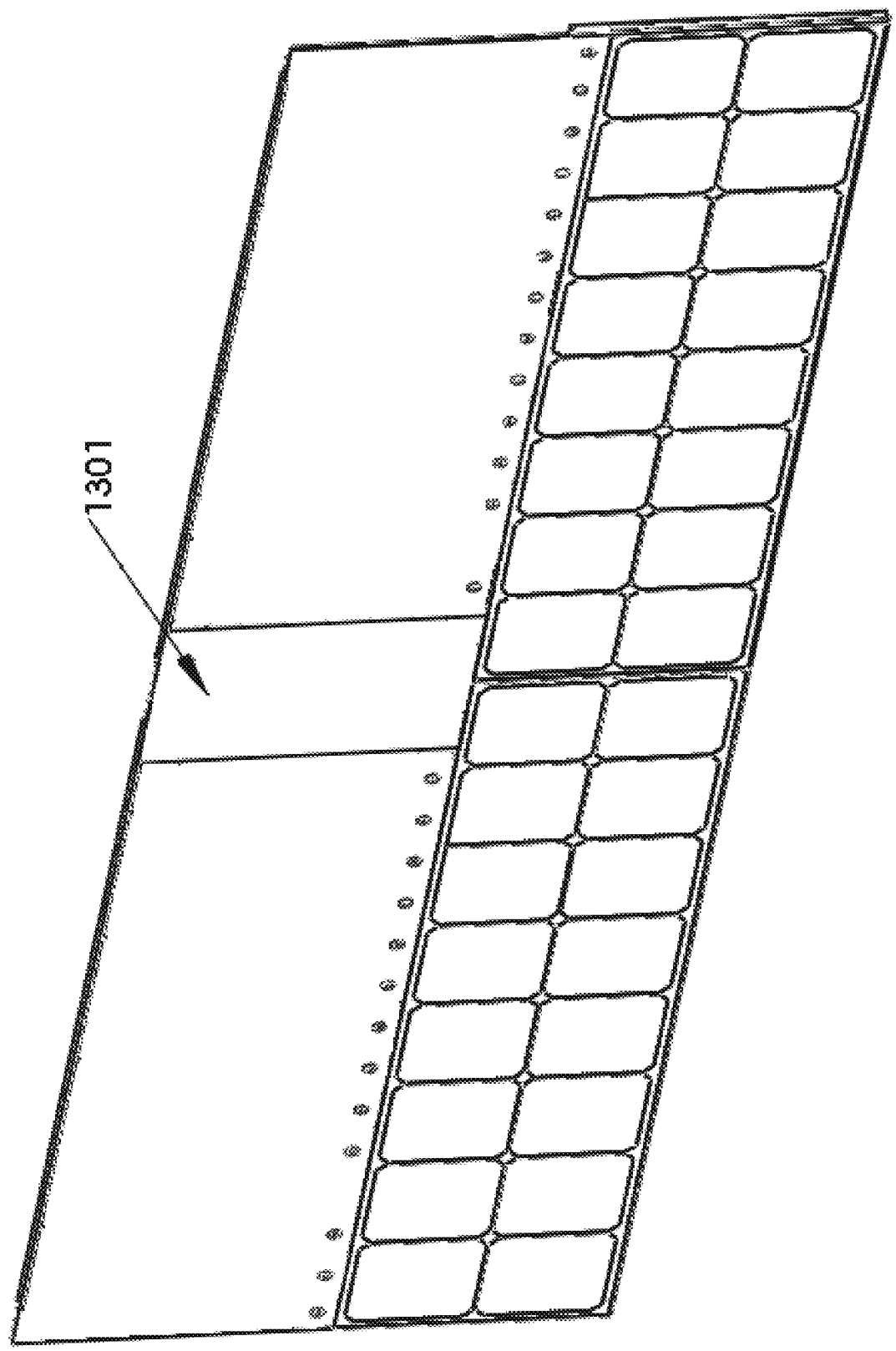
FIG. 13 shows an exemplary embodiment of the layout of two adjacent installed shingles with a waterproofing sheet (1301) sealing the headlap of the joint between them.
Figure 14:
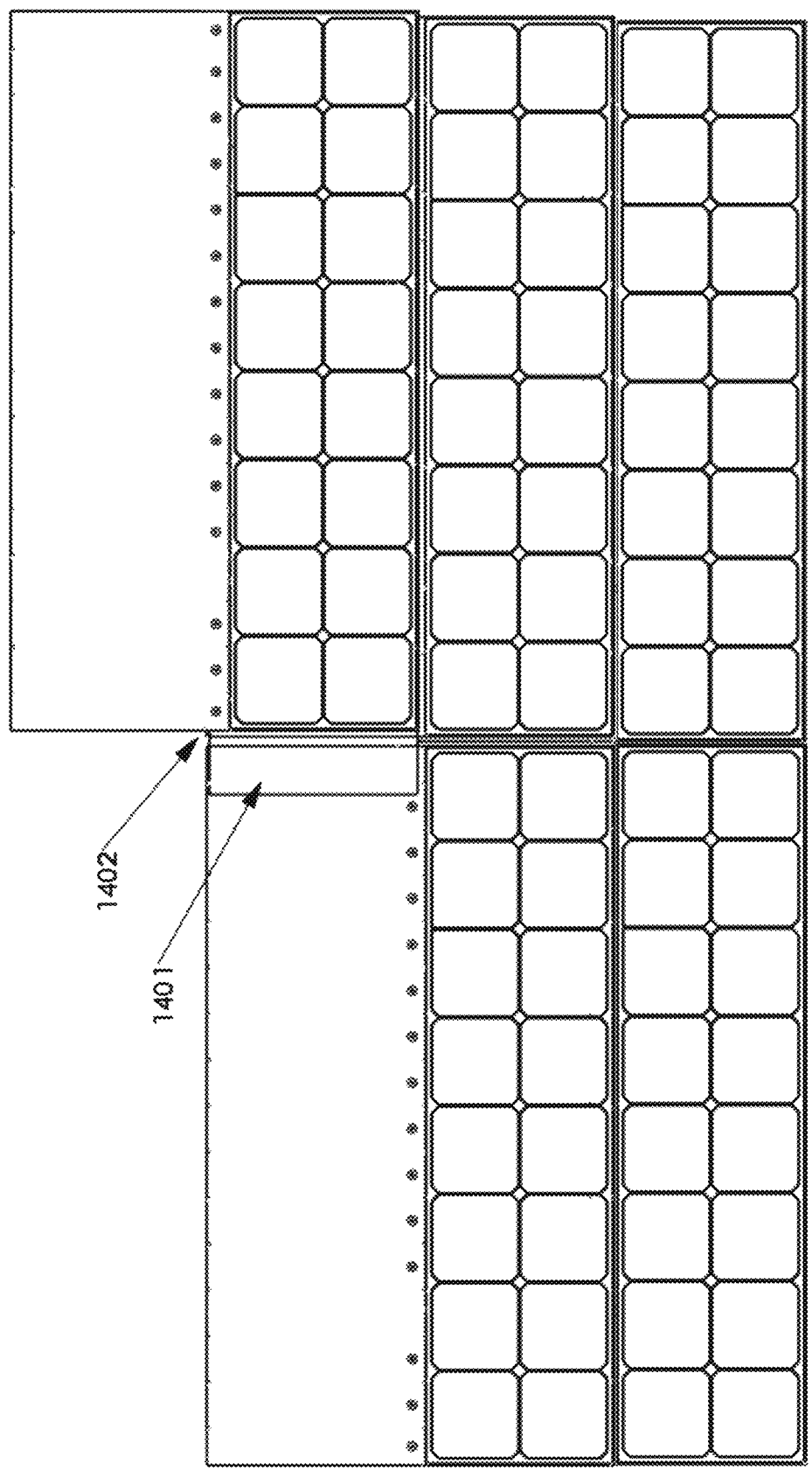
FIG. 14 shows an exemplary embodiment of a PV shingle installation with a waterproofing sheet (1401) sealing the headlap joint between two adjacent panels.
Figure 15:
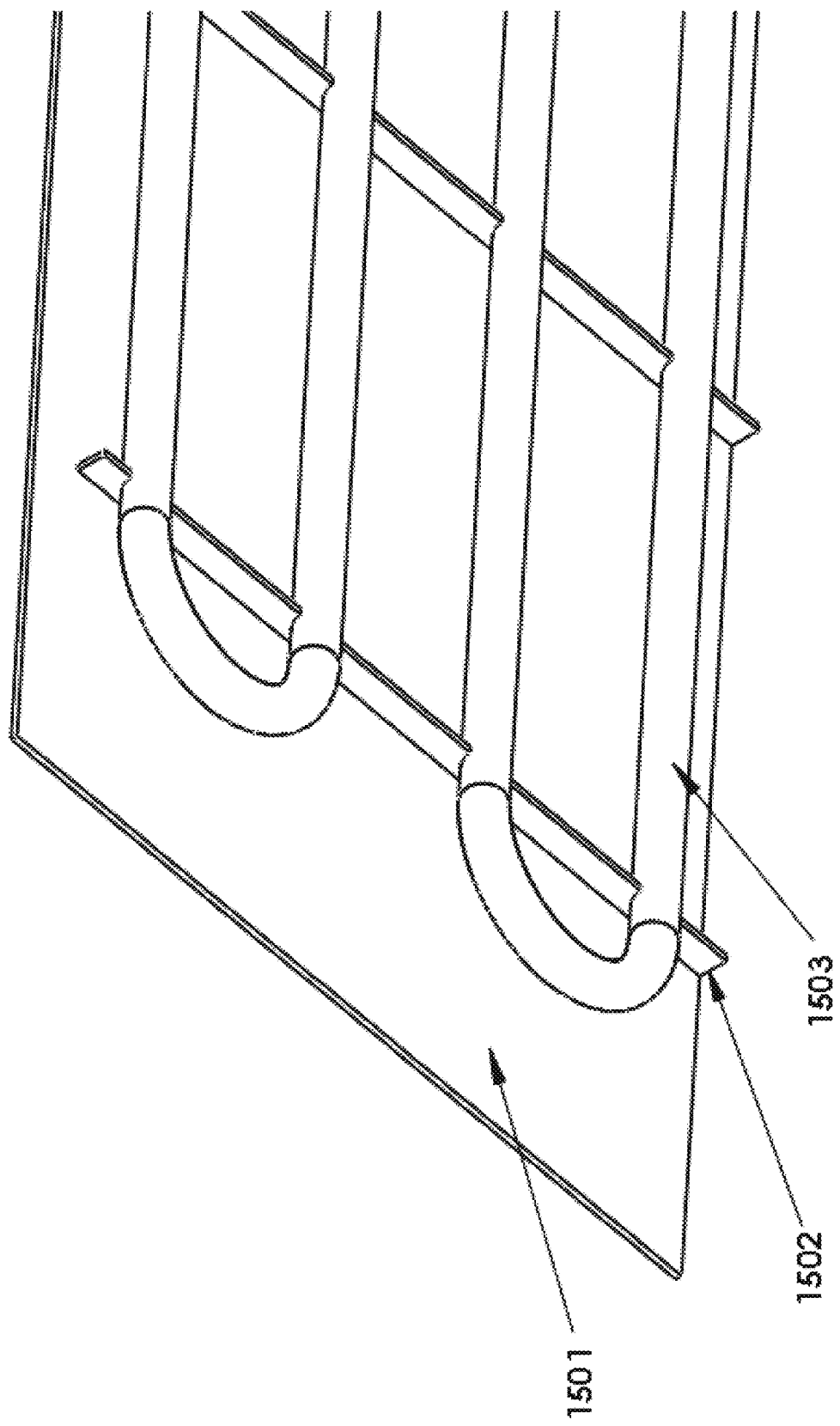
FIG. 15 shows an exemplary embodiment of thermal energy generating solar module with IR transmitting glass (1501), a support (1502) for the glass and/or solar absorbing tubes and tubes (1503) that absorb heat and carry heat-transfer fluid.
Figure 16:
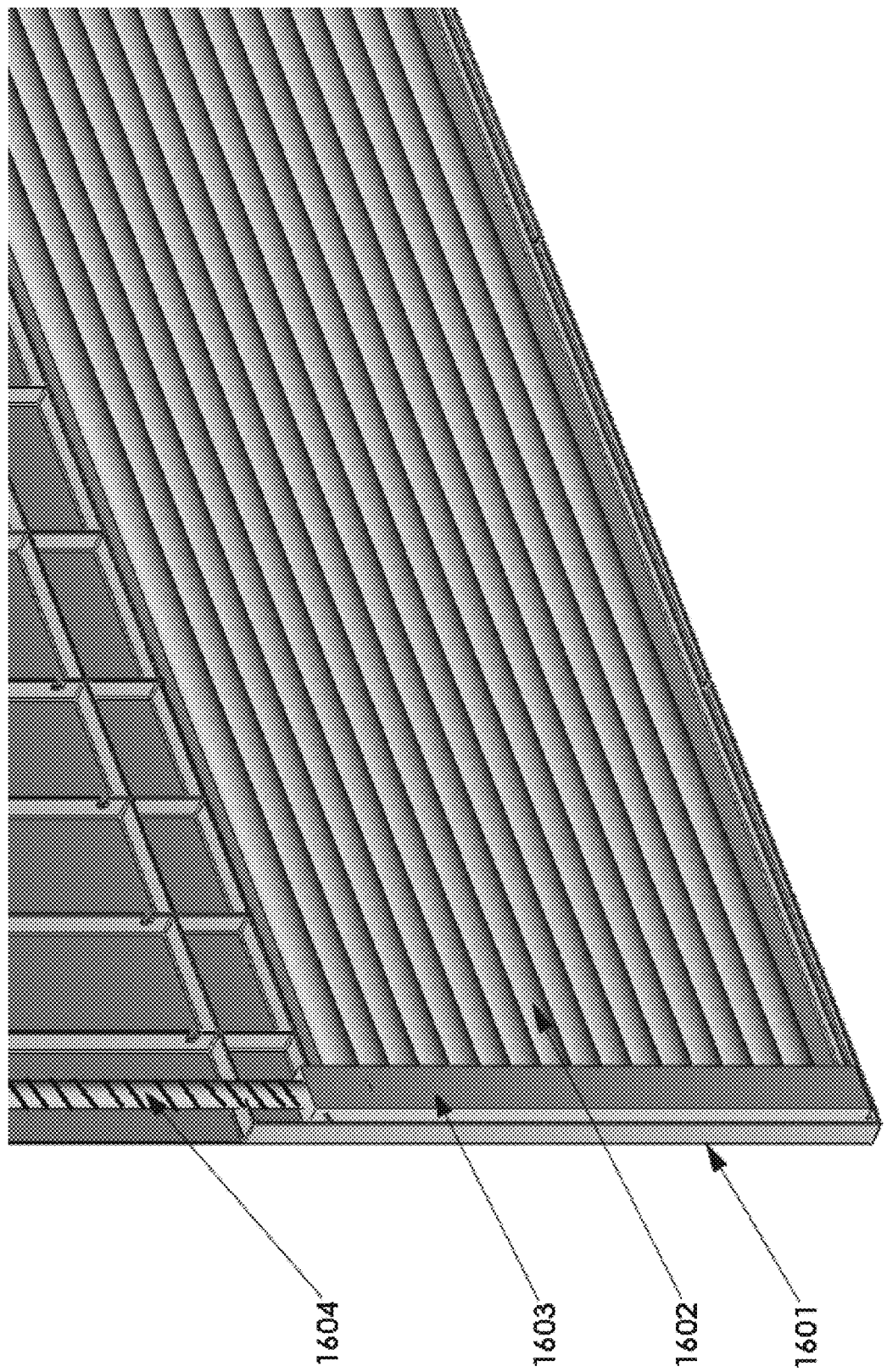
FIG. 16 shows an exemplary embodiment of the underside thermal energy generating solar shingle with a composite frame (1601), IR absorbing tubes (1602), a manifold for collecting heat transfer fluid from the array of tubes (1603), and a corrugated tube (1604) to transport fluid from the manifold to a series connection with an adjoining panel or to pass through the roof surface for storage and distribution.

The invention claimed is:

1. A roofing shingle comprising:
a body formed from a bulk molding compound (BMC) or sheet molding compound (SMC) comprised of polyester resin; where the BMC or SMC has a coefficient of thermal expansion is less than $2.3\times10^{-5}$ $C^{-1}$ an exposure area with multiple photovoltaic cells;
an integrated headlap without photovoltaic cells;
a nailing strip embedded within the body for secure attachment to a roofing structure;
ribs on the underside of said headlap and a nailing strip allowing for the passage of wires from the photovoltaic cells to the headlap;
and overhanging structures, without ribs, on each lateral side of the headlap providing a weather-exposure protected area for electrical connections between adjacent shingles.

2. The roofing shingle of claim 1, further comprising a single electrical connector within an insulated housing attached to the underside of said overhang with female and male terminals in a parallel orientation in the direction of the roof slope allowing single wires of opposite polarity from adjacent shingles connect in series where the connectors are single-pole connectors.

3. The roofing shingle of claim 1, wherein the nailing strip has indentations indicating locations for fasteners that do not coincide with the wiring passages used to route wires from the solar modules in the exposure to the headlap.

4. The BMC and SMC formulation of claim 3 where: the stabilizer can be at least one of the following: carbon black, benzophenones, phosphite anti-oxidants, or phenolic anti-oxidants;
where the filler can be at least one of the following: hemp, kenaf, wood, cotton, jute, flax, rice hulls, rice hull ash and waste fiber dust or particles with a silica content of >10%;
where the flame retardant can be at least one of the following: aluminum trihydrate, magnesium hydroxide, or rice hulls;
where the anti-static agent is carbon black or other conductive particles.

5. A roofing shingle comprising:
a body formed from a bulk molding compound (BMC) or sheet molding compound (SMC); comprised of polyester resin; where the BMC or SMC has a coefficient of thermal expansion is less than $2.3\times10^{-5}$ $C^{-1}$ an exposure area with a solar-thermal module;
an integrated headlap without a solar-thermal module;
a nailing strip embedded within the body for secure attachment to a roofing structure;
ribs on the underside of said headlap, exposure and nailing strip;
and overhanging structures, without ribs, on each lateral side of the headlap providing weather-exposure protected areas for heat transfer fluid tubing connections.

6. The roofing shingle of claim 5, further comprising a heat transfer fluid tubing connector attached to the underside of said overhang, with connector terminals arranged in a parallel orientation in the direction of the roof slope, allowing two tubes approaching from the same direction to connect to each other allowing fluid flow between adjacent shingles, where the connection allows the fluid flow to reverse direction by about 180 degrees.

7. The BMC and SMC formulation of claim 6 where: the stabilizer can be at least one of the following: carbon black, benzophenones, phosphite anti-oxidants, or phenolic anti-oxidants;

where the filler can be at least one of the following: hemp, kenaf, wood, cotton, jute, flax, rice hulls, rice hull ash and waste fiber dust or particles with a silica content of >10%;

where the flame retardant can be at least one of the following: aluminum trihydrate, magnesium hydroxide, or rice hulls.

* * * * *